J. W. CALHOUN.
WATER METER SYSTEM.
APPLICATION FILED AUG. 15, 1911.

1,103,655.

Patented July 14, 1914.

WITNESSES.
G. C. Raymond
John F. Will

INVENTOR.
John W. Calhoun
By Kay & Totten
Attorneys

UNITED STATES PATENT OFFICE.

JOHN W. CALHOUN, OF CONNELLSVILLE, PENNSYLVANIA.

WATER-METER SYSTEM.

1,103,655.  Specification of Letters Patent.  Patented July 14, 1914.

Application filed August 15, 1911. Serial No. 644,221.

*To all whom it may concern:*

Be it known that I, JOHN W. CALHOUN, a citizen of the United States, and resident of Connellsville, in the county of Fayette and State of Pennsylvania, have invented a new and useful Improvement in Water-Meter Systems; and I do hereby declare the following to be a full, clear, and exact description thereof.

My invention relates to meters, and is especially directed to water meters such as those controlling supply to large works.

It is found that the ordinary large water meter is not usually sufficiently sensitive to register the flow of a small stream, and consequently at times much water passes through without being measured or registered.

My invention has for its object to overcome this difficulty.

It consists, generally stated, in the combination with two meters of different capacity, of a casing containing a delivery chamber into which the delivery pipes of different size enter from the two meters, and valves of different sizes controlling the outlet ports from the meters and connected together so that upon the reduction of flow the delivery port from the larger meter will be closed and the water will pass through the smaller meter which is capable of measuring a smaller flow or stream.

Figure 1:
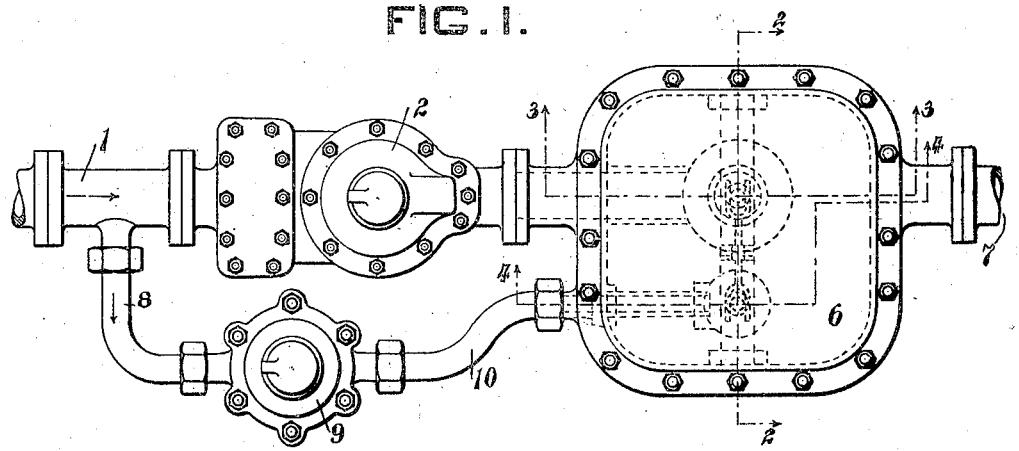
Figure 2:
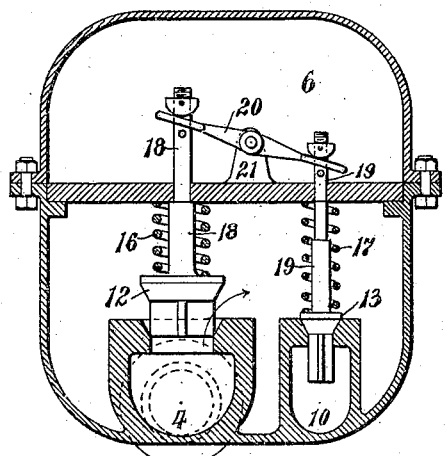
Figure 3:
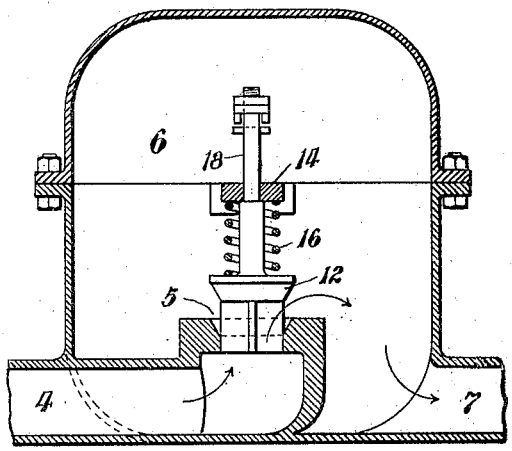
Figure 4:
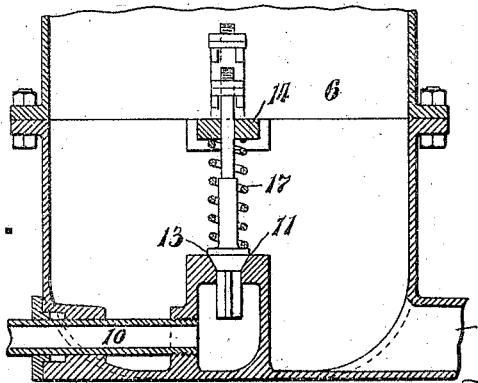

In the accompanying drawings Figure 1 is a top or plan view illustrating the invention; Fig. 2 is a cross section on the line 2—2 Fig. 1; Fig. 3 is a longitudinal section on the line 3—3 Fig. 1; and Fig. 4 is a longitudinal section on the line 4—4 Fig. 1.

The supply main 1 leads to the main meter 2 intended to measure the entire supply when a heavy stream is being drawn through the meter. This meter communicates with the pipe 4 having the outlet port 5 within the casing 6 having the discharge pipe 7 connected to any place of use. The branch pipe 8 leads from the supply pipe 1 to the smaller meter 9 which by the pipe 10 having the delivery port 11 communicates with the same chamber 6. The meters employed may be of any particular type, being simply illustrated diagrammatically and may be arranged for measuring any suitable fluid, though the special use intended is for the measuring of water. The meters are of different capacities, the main meter 2, as above stated, being adapted to measure the full supply while the small meter 9 is adapted only to measure a relatively small flow. The delivery pipes 4 and 10 and their respective ports 5 and 11 correspond to the meters with which they are connected, the port 5 being adapted to deliver a large flow while the port 11 delivers only a small flow into the common chamber.

Mounted above the ports 5 and 11 of the pipes 4 and 10 where they enter the common chamber 6 are the valves 12 and 13 of size corresponding to the ports, the valve 12 being of large size and the valve 13 of relatively small size. The valves are suitably mounted to close their ports, being shown as guided by the cross brace 14 and by suitable wings within the ports. The valves are properly weighted as by springs 16, 17, confined between the cross brace 14 and the valve bodies and fitting around the valve stems 18, 19, these stems extending up through the cross brace and being connected by the pivot lever 20 engaging with the upper ends of the valve stems, the lever being shown as mounted on the bearing 21. The valves may, however, be located and mounted in any suitable way to accomplish the end intended. The spring 16 of the valve controlling the main meter supply 2 is of heavier power than the spring 17 and the valve 12 has a more extended valve surface within the chamber 6 than the valve 13.

The valves are mounted so that when a relatively heavy pressure is developed within the chamber 6 it coöperates with the spring 16 controlling the valve 12 to permit said spring to close the same and thereby open the valve 13. When a full supply of water is being drawn through the discharge pipe 7 the pressure in the chamber 6 is relatively lowered and the pressure in the main delivery pipe 4 from the main meter 2 holds the valve 12 open, the spring 17 then closing the small valve 13. Water then flows through the main meter in excess of the amount drawn through the discharge pipe 7, in which case the pressure within the chamber 6 is increased and reacts upon the large valve head of the valve 12 in addition to the weight or force of the spring controlling that valve, to close the same, and in so closing it to open the valve 13, when the small amount of water then being used is drawn through the smaller meter 9, which is of such size that it will accurately measure such small stream or flow. This continues until a greater draft is made upon the supply which lowers the pressure within the chamber 6, whereupon the pressure within the main supply, through the main meter 2 and the pipe 4, is sufficient to raise the valve 12 and form communication through said pipe with the chamber 6, in which case it permits the lowering of the valve 13 controlling the small meter outlet, and that valve is closed and the main meter which is adapted to measure the large supply acts to measure all the water passing through. By means of this connection provision is made for the measuring of the entire supply either through the main large meter or the small meter, and the difficulties encountered where only one large meter is employed are entirely overcome.

What I claim is:

1. The combination with a supply main, of two meters of different capacity communicating therewith, a casing containing a delivery chamber communicating with the delivery side of said meters by separate ports, valves within said chamber controlling said ports, and closer means of different strengths operating to close said valves, respectively, the openings of said valves being controlled by the combined action of the varying fluid pressures within said chamber, and said closer means.

2. The combination with a supply main of two meters of different capacity communicating therewith, a casing containing a delivery chamber communicating with the delivery side of said meters, respectively, by different ports, valves within said chamber adapted to close said ports, respectively, closer means of strengths proportionate to the capacity of the two meters acting upon the valves communicating with the corresponding meters, and operative connections between said valves whereby the opening and closing of said valves is controlled by the combined action of the fluid pressure within said chamber, said closer means and said connection, on said valve.

3. The combination with two meters of different capacity, of the casing 6 containing a delivery chamber, the meters having outlets 5, 11 respectively, communicating therewith, the valves 12, 13, having controlling springs 16, 17, and the lever 20 connecting said valves.

In testimony whereof, I the said JOHN W. CALHOUN have hereunto set my hand.

JOHN W. CALHOUN.

Witnesses:
J. S. MUNROE,
M. A. COFFEY.